United States Patent [19]

Tabacchi et al.

[11] Patent Number: 4,598,983
[45] Date of Patent: Jul. 8, 1986

[54] METAL FRAME FOR EYEGLASSES

[76] Inventors: Vittorio Tabacchi, Piazza Tiziano n. 45, Pieve di Cadore; Vincenzo Viel, Via Brustolon n. 12, Calalzo di Cadore, both of Italy

[21] Appl. No.: 503,425
[22] Filed: Jun. 13, 1983
[51] Int. Cl.[4] .................................................. G02C 1/08
[52] U.S. Cl. .......................................... 351/95; 351/90
[58] Field of Search ........................ 351/90, 91, 92, 93, 351/94, 95, 96, 98, 99, 100, 101, 102, 121, 153

[56] References Cited

U.S. PATENT DOCUMENTS 372,954  11/1887  Bishop .................................... 351/90
653,931   7/1900  Lowres .................................... 351/90
2,551,144 5/1951  Lindemann et al. .................... 351/97

Primary Examiner—Rodney B. Bovernick
Attorney, Agent, or Firm—Howard I. Schuldenfrei

[57] ABSTRACT

A metal frame for eyeglasses, which comprises a front frame having a pair of wire rings to each of which there is fastened, on the outermost part, a nose for the hinging of a bar. Each nose consists of a pair of plates and of means for tightening one plate against the other. Each ring is cut at the place corresponding to its nose and its two end portions corresponding to the cut are shaped and held by form locking in corresponding anchoring seats defined by the clamped plates.

1 Claim, 6 Drawing Figures

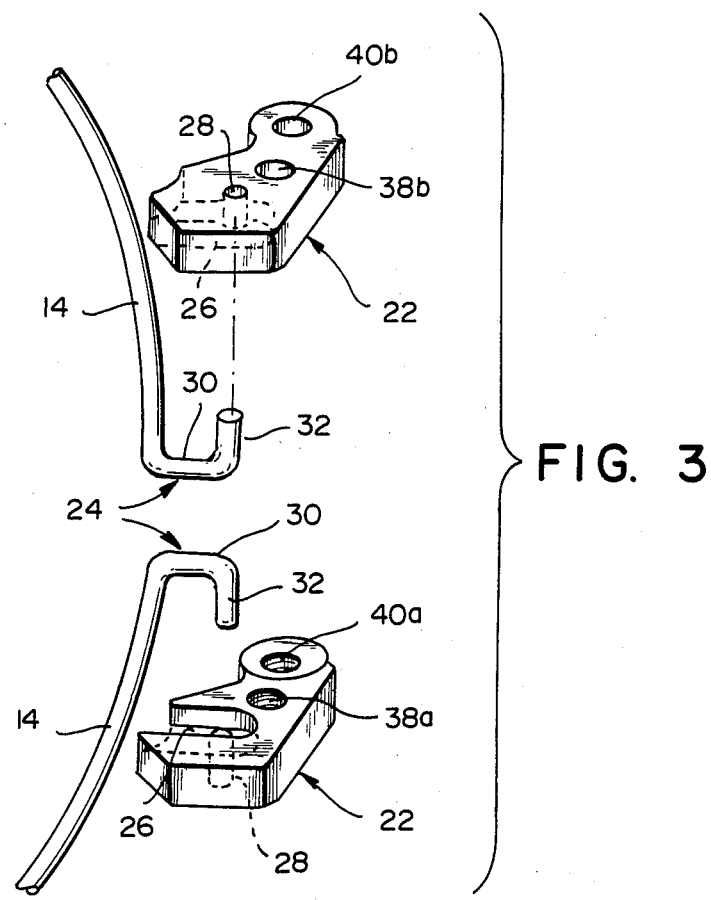
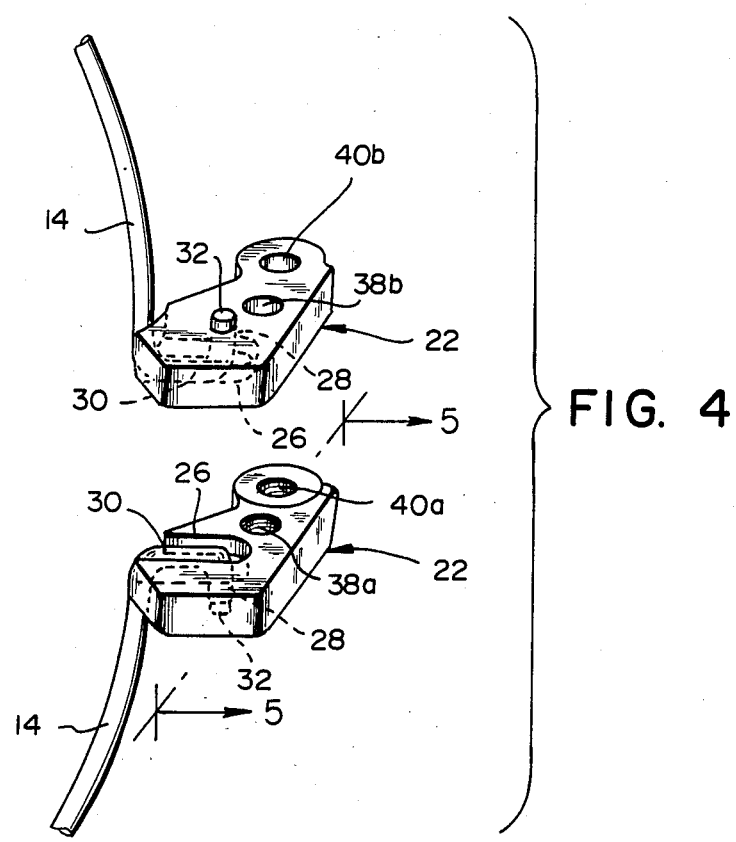
FIG. 3
FIG. 4

FIG. 5
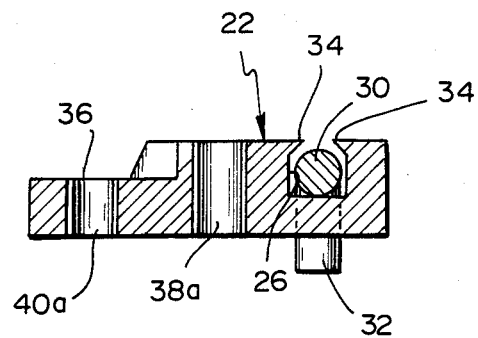
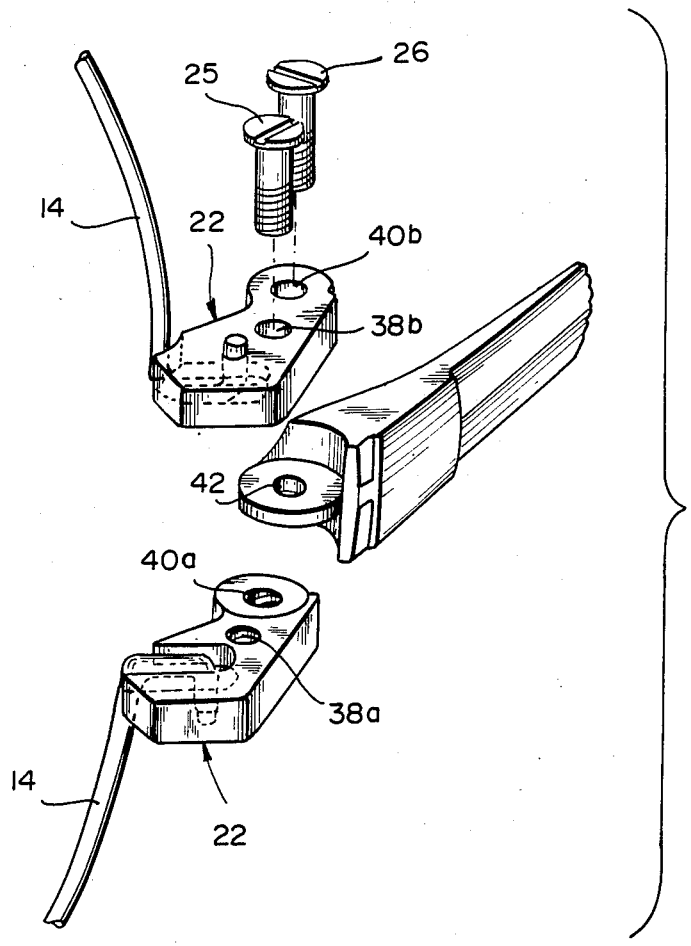
FIG. 6

METAL FRAME FOR EYEGLASSES

BACKGROUND OF THE INVENTION

The present invention refers to a metal frame for eyeglasses, of the type comprising a front frame having a pair of wire rings to each of which on its outermost part there is fastened a nose for the hinging of a bar.

In a metal frame whose front frame is a metal wire, in particular a stainless steel wire, it is desirable for the wire to have the maximum elasticity so that it does not undergo permanent deformation as a result of the repeated bendings caused by the moving apart of the bars.

In the known frames, the metal noses are fastened by welding to the respective rings of the front frame. This welding necessarily results in the heating of the metal wire, causing the annealing thereof specifically in that region where properties of elastically are most desirable. The annealed region of the wire is therefore subject to the aforesaid undesirable permanent deformations.

The object which forms the basis of the present invention is to produce a frame of the type described above, which does not have this drawback.

SUMMARY OF THE INVENTION

Generally speaking, in accordance with the present invention, this object is solved by means of a metal frame of the aforementioned type, which is characterized by the fact that each nose consists of a pair of plates and of means for clamping one plate against the other and by the fact that each ring is cut at the place corresponding to its nose and its two end portions corresponding to the cut are shaped and held by form locking in corresponding anchoring seats defined by the clamped plates.

As a result of this solution, there is obtained a completely mechanical connection between the rings and the noses, this connection not entailing for its production any heating of the wire constituting the rings of the front frame. The wire is not subjected to any annealing and after the attachment of the nose retains its desirable characteristics of elasticity which prevent permanent deformation thereof upon use.

Accordingly, it is an object of this invention to provide an improved metal wire frame wherein the wire retains maximum elastically even after repeated bending of the side bars or temples.

Another object of the invention is to provide an improved metal wire frame, which does not become permanently deformed after repeated bending of the side bars or temples.

Still other objects and advantages of the invention will in part be apparent from the specification.

The invention accordingly comprises the features of construction, combinations of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIGS. 3 and 4 are perspective views similar to FIG. 2, illustrating two successive phases of the assembling of a ring and a nose in accordance with the invention;

FIG. 5 is a cross-section on a larger scale along the plane indicated by the line 5—5 of FIG. 4;

FIG. 6 is an exploded view in perspective, which illustrates a further phase of assembly, which precedes the assembled condition shown in FIG. 2.

DETAILED DESCRIPTION OF THE INVENTION

Figure 1:
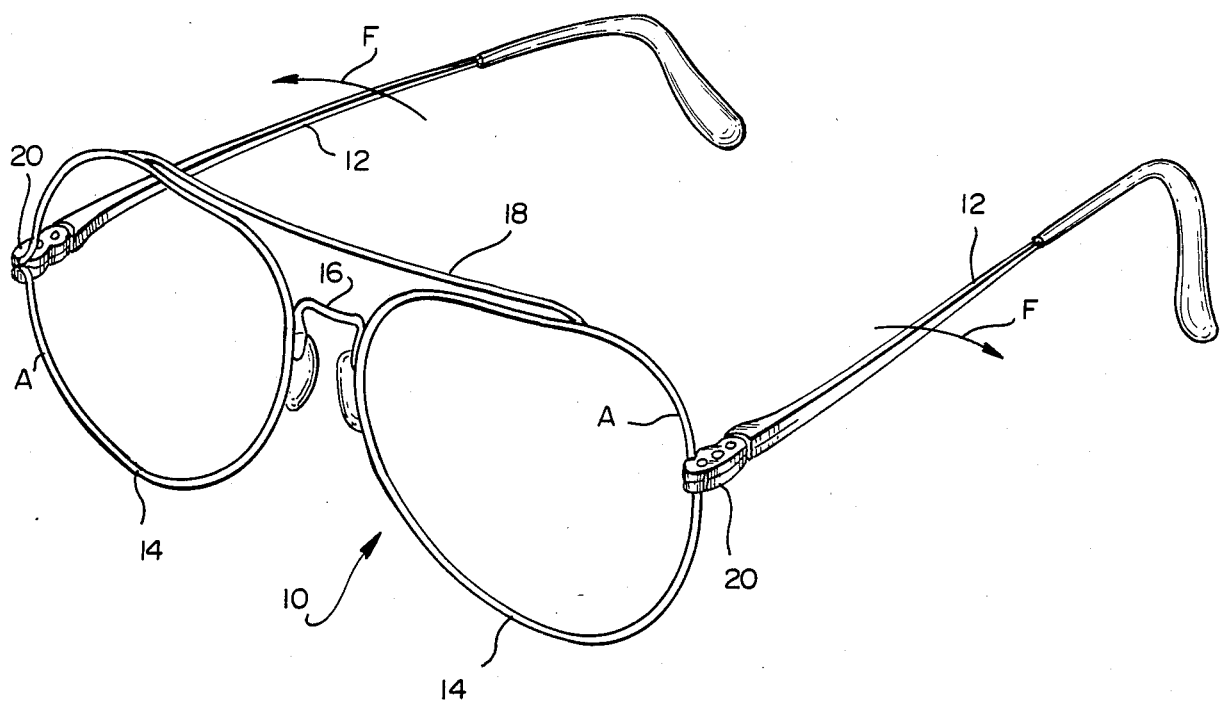
FIG. 1 is a perspective view of a frame in accordance with the invention.

Referring now to FIG. 1, there is shown a frame for eyeglasses which comprises a front frame, designated generally as 10, and a pair of bars 12. The frame 10 is formed essentially of a pair of rings 14 of metal wire, in particular stainless steel wire, which are intended to receive the lenses. The two rings 14 are connected together by a bridge 16 and a cross-member 18 in known manner.

Each of the bars 12 is hinged to the inside of the corresponding ring 14 by a nose 20 whose structure will be described with reference to the following figures.

In FIG. 1, the arrows F indicate the spreading movements and forces to which the bars 12 are subjected in use. These forces concern those areas indicated by A of the rings 14, which are located near the noses 20. Since in traditional frames the noses are welded to the rings 14, the regions A are specifically the weakest and most susceptible to experiencing permanent deformation as a result of the annealing to which they have been subject in the operation of the welding of the noses.

Figure 2:
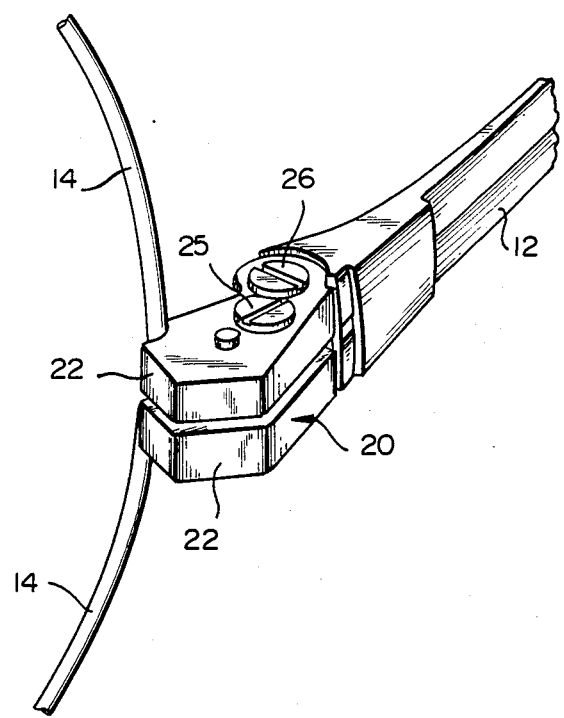
FIG. 2 is a fragmentary perspective view of a larger scale of the portion contained within the circle indicated by II—II in FIG. 1.

Referring to FIG. 2, each nose comprises a pair of superimposed metal plates, for instance of stainless steel, marked 22. The two plates 22 are clamped together by a screw 25. Another screw 26 acts as pin for the corresponding bar 12, as will be shown further below.

Referring to FIG. 3, each ring 14 is cut at the place corresponding to its nose and its two end portions corresponding to the cut and designated 24 are shaped or bent substantially in U shape, with their convexities facing each other.

In each plate 22 there is provided a transverse groove 26. Starting from the bottom of each groove 26, the plate 22 is traversed by a continuous hole 28.

Each shaped end portion 24 comprises a transverse section 30 and an end section 32.

In order to assemble the nose 20 (FIGS. 1 and 2) to the ring 14, the end portion 32 of each shaped part 24 is inserted, as illustrated in FIG. 4, into the hole 28 and its transverse section 30 is placed in the groove 26.

An upsetting of the portions of the plates 22, which correspond to the edges of the grooves 26, is preferably then effected, as illustrated at 34 in FIG. 5. The offsets 34 hold the corresponding transverse section 30 in position, preventing the plate 22 from coming loose from the end portion 24 until the two plates 22 have been fastened together by means of the screw 24.

The two plates 22 have corresponding lowered facing portions 36, as shown in FIG. 5. Two holes are provided in the plates 22 of each pair. The holes of the lower plate, designated 38a and 40a, are threaded, while the holes in the upper plates, designated 38b and 40b, are smooth.

The holes 38a, 38b serve to fasten the plates 22 together by means of the screw 25. The clamping obtained by means of the screw 25 serves to anchor or firmly hold the end portion 24 of the ring 14 to the nose 20, due to the form-locking of the shaped portions 24 and of the corresponding anchoring seats 26, 28. At the same time, continuity of the ring 14 is established.

The lowered zones 36 of the plates 22 of each pair, after the plates have been clamped together, define a receiving hole for a hinge lug 42 of the bar 12. The hinging of the bar 12 is effected by means of the screw 26, which is inserted into the smooth hole 40b, the hole of the lug 42 and the threaded hole 40a. In a frame in accordance with the invention, it is possible readily to replace a lens in a ring 14 by simply lossening the screw 25. Thus, it is also possible to replace a bar 12 by simple removal of the screw 26.

It will thus be seen that the objects set forth above, among those made apparent from the preceding description, are efficiently attained and, since certain changes may be made in the above constructions without departing rrom the spirit and scope of the invention, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a metal frame for eyeglasses of the type having metal wires rings in which lenses may be mounted, means mounted between the wire rings for positioning the frame on the bridge of the wearer's nose and a temple of the hinging bar type connected to each ring, an improved means for connecting the temple to the wire ring which comprises a pair of complementary U-shaped mirror image projections which are formed in the discontinuous wire ring, each U-shaped mirror image projection including a transverse member having connected to it a free end, a nose consisting of a pair of mirror image superposed plates, a set screw for clamping one superposed plate against the other, the engaged surfaces of the plates each having formed therein an anchor seat, each anchor seat comprising a groove in the surface of the plate in which the transverse member of the projection is received and a hole through the plate in which the free end of the projection is mounted, the grooved surface of the plates being mounted face to face to form the noses, each U-shape projection in the wire ring being form locked in the anchor seat, and a means for pivotally connecting a temple to the nose comprising a lug mounted on an end of the temple piece, and a cavity defined between the superposed plates of the nose into which the lug on the temple piece is movably mounted, the temple piece being movable between open and closed positions.

* * * * *